United States Patent [19]
Nagata et al.

[11] Patent Number: 5,655,281
[45] Date of Patent: Aug. 12, 1997

[54] CYLINDER RECIPROCATION CONTROL APPARATUS AND RING ALIGNMENT APPARATUS

[75] Inventors: Katsuhiro Nagata; Kazuhiko Touno; Tsutomu Kobayashi, all of Aichi Pref., Japan

[73] Assignees: Asahi Chiyoda Kogyou Co. Ltd.; Teikoku Piston Ring Co., Ltd., both of Japan

[21] Appl. No.: 340,622

[22] Filed: Nov. 16, 1994

[30] Foreign Application Priority Data

Nov. 26, 1993 [JP] Japan ................................ 5-321417

[51] Int. Cl.$^6$ ........................................... B23P 19/04
[52] U.S. Cl. ...................... 29/252; 29/281.5; 29/271
[58] Field of Search ........................ 29/809, 822, 464, 29/466, 467, 468, 271, 281.5, 281.1, 252

[56] References Cited

U.S. PATENT DOCUMENTS 4,141,139  2/1979  Jacobson et al. .................... 29/758
5,083,372  1/1992  Polutnik et al. ..................... 29/464
5,205,028  4/1993  Leonard ............................. 29/271

*Primary Examiner*—Robert C. Watson
*Attorney, Agent, or Firm*—Andrus, Sceales, Starke & Sawall

[57] ABSTRACT

A reciprocation control apparatus includes a manifold including delivery and exhaust ports formed therethrough, the manifold being movable between an air delivery/exhaust pipe to a pushing-out cylinder and an air delivery pipe to an air supply. When the manifold is moved to a position in which the delivery and exhaust ports are connected to each other, air is selectively supplied to or exhausted from the head and cap sides of the pushing-out cylinder. Thus, the pushing-out cylinder can easily and simply be controlled in reciprocation. When such a reciprocation control apparatus is incorporated into a ring alignment apparatus, the ring alignment apparatus can easily and simply be switched from one state to another with an automated alignment being carried out to handle a number of ring members.

8 Claims, 17 Drawing Sheets

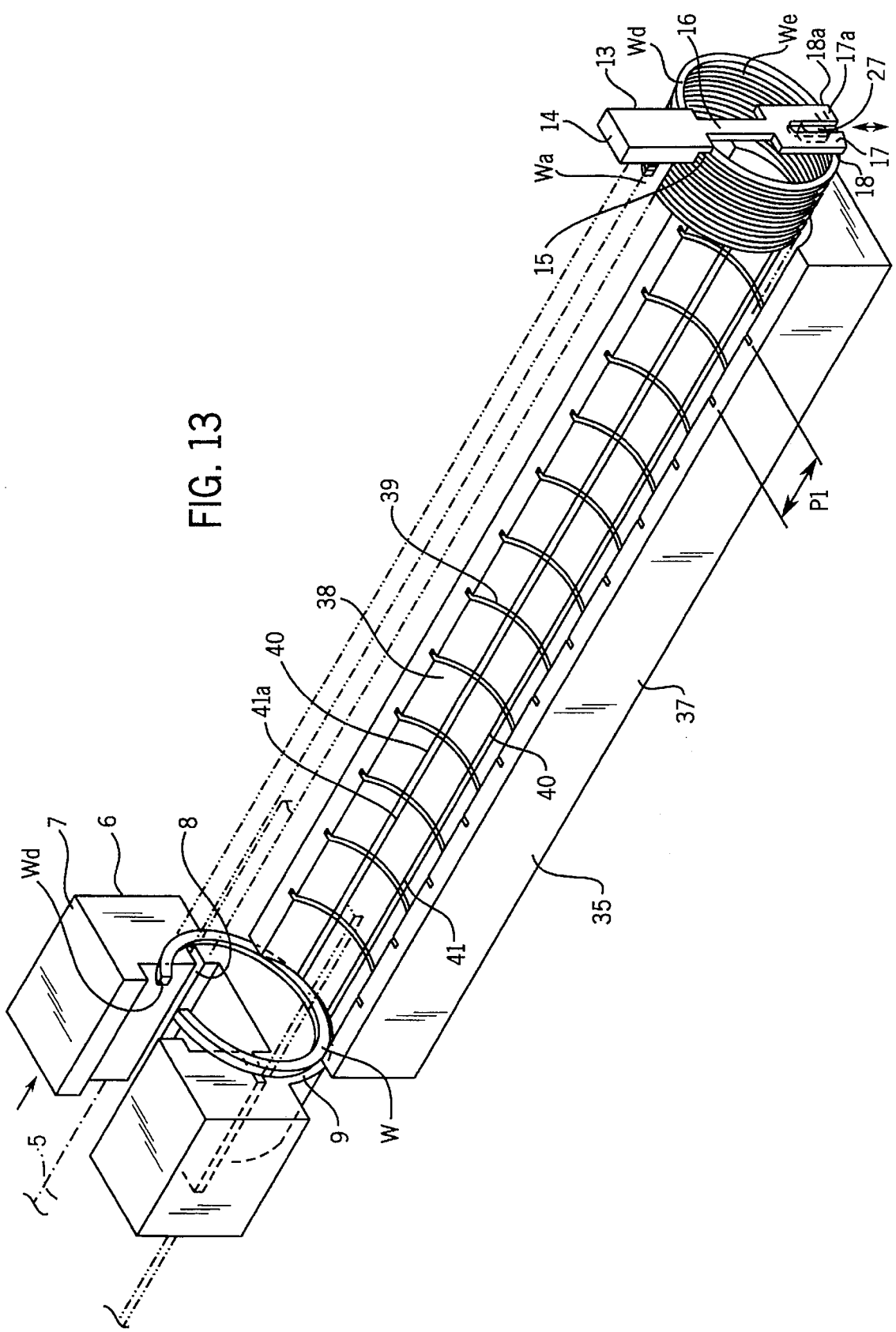

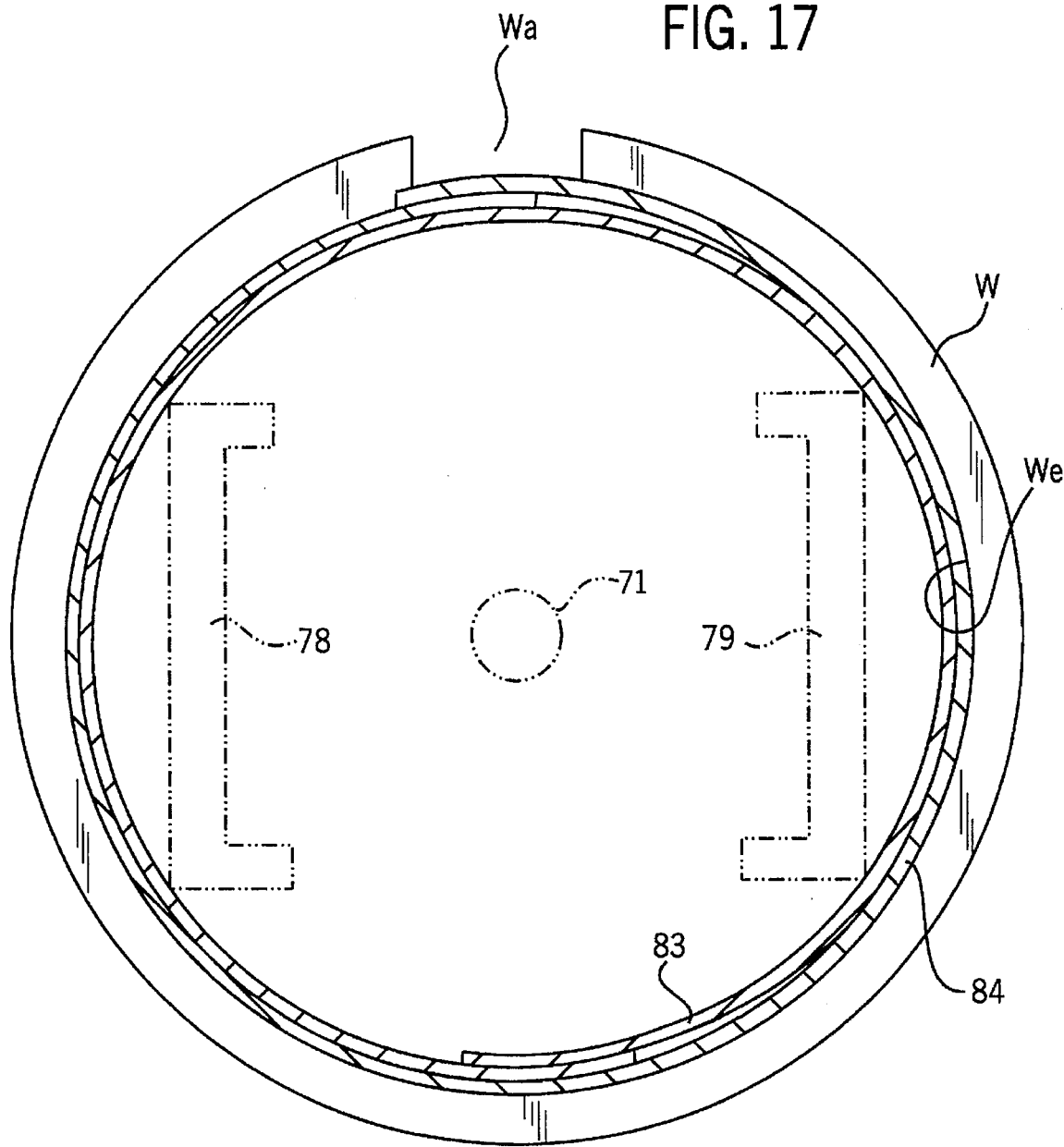

5,655,281

CYLINDER RECIPROCATION CONTROL APPARATUS AND RING ALIGNMENT APPARATUS

BACKGROUND OF THE INVENTION

1. Field of the Invention

The present invention relates to a cylinder reciprocation control apparatus capable of shortening time required to switch the direction of reciprocation in a cylinder and improving the durability and a ring alignment apparatus using such a cylinder reciprocation control apparatus to align and holding a plurality of ring members each having a gap upstanding in a continuous manner.

2. Description of the Prior Art

In the prior art, means for reciprocating a cylinder a includes a two-position type four-port electromagnetic valve b for switching the cap and head sides of the cylinder a with respect to air delivery and exhaust, as shown in FIG. 18. Such a four-port electromagnetic valve b has its response speed retarded through reciprocation of various movable parts such as spool, poppet and others. In addition, more time is required to perform the air delivery/exhaust operation relative to the cap and head sides of the cylinder a. Time required to reciprocate the cylinder a through one cycle is a minimum of about two seconds. Furthermore, the four-port electromagnetic valve b is disadvantageous in that it is of a complicated structure including solenoids, spool, poppets and others and has less durability.

In the prior art, means for aligning and holding ring members upstanding is in the form of a block member including a plurality of grooves formed therein and spaced away from one another in the longitudinal direction. Ring members are manually fitted into the respective grooves in the block.

It is therefore an object of the present invention to provide a cylinder reciprocation control apparatus which can easily and simply vary the reciprocation repeating cycle and reduce time required to switch the direction of reciprocation in the cylinder with an improved durability.

Another object of the present invention is to provide a ring alignment apparatus which can easily and simply be automated to align and hold a plurality of ring members upstanding with an improved operativity.

SUMMARY OF THE INVENTION

To this end, the present invention provides a cylinder reciprocation control apparatus comprising a plate-like manifold including a number of delivery ports formed linearly therethrough and a number of exhaust ports formed curvedly therethrough, said delivery and exhaust ports being arranged on at least one arrangement line, means for moving said manifold along said arrangement line, a pushing-out cylinder, an air supply, air delivery/exhaust pipe means connected to the head and cap sides of said pushing-out cylinder, and two air delivery pipe means connected to said air supply, the ends of said air delivery/exhaust pipe means being engaged by the top of said manifold at said arrangement line, the ends of said air delivery pipe means from said air supply being engaged by the bottom of said manifold at positions corresponding to the ends of said air deliver/exhaust pipe means, said deliver and exhaust ports being arranged such that one of said delivery ports is located between the end of said air delivery/exhaust pipe means on the head side and the end of one of said air delivery pipe means while one of said exhaust ports is located between the end of said air delivery/exhaust pipe means on the cap side and the end of the other air delivery pipe means.

The present invention also provides a ring alignment apparatus comprising a work bench having a working axis, a work support mounted on said work bench at one end, said work support including slide groove means formed therein and extending along the working axis and operative to engage and hang a plurality of ring members at their gaps, means for applying a thrust force to an array of said ring members hung from said work support forwardly along the working axis, stopper means for limiting the forward movement of said hung ring member array, said stopper means being spaced away from the forward end of said work support with such an opening that a ring member can freely fall therethrough when the thrust force is not applied to that ring member, a reciprocation control system comprising a plate-like manifold including a number of delivery ports formed linearly therethrough and a number of exhaust ports formed curvedly therethrough, said delivery and exhaust ports being arranged on at least one arrangement line, means for moving said manifold along said arrangement line, a pushing-out cylinder, an air supply, air delivery/exhaust pipe means connected to the head and cap sides of said pushing-out cylinder, and two air delivery pipe means connected to said air supply, the ends of said air delivery/exhaust pipe means being engaged by the top of said manifold at said arrangement line, the ends of said air delivery pipe means from said air supply being engaged by the bottom of said manifold at positions corresponding to the ends of said air deliver/exhaust pipe means, said deliver and exhaust ports being arranged such that one of said delivery ports is located between the end of said air delivery/exhaust pipe means on the head side and the end of one of said air delivery pipe means while one of said exhaust ports is located between the end of said air delivery/exhaust pipe means on the cap side and the end of the other air delivery pipe means, and said ring alignment apparatus further comprising urging means for engaging and downwardly urging the ring member array under the action of the pushing-out cylinder in said reciprocation control system, an alignment block having a block body on the top of which a recess is formed to extend in the longitudinal direction and includes a plurality of grooves spaced away from one another with a pitch in the longitudinal direction, each of said grooves being operative to receive part of one of said ring members, the longitudinal axis of said alignment block being the working axis, and a mover connected to said manifold and alignment block and movable on said work bench below said work support along the working axis.

BRIEF DESCRIPTION OF THE DRAWINGS

FIG. 15 is a perspective view, partially omitted, of the work pushing-out mechanism, illustrating the array of aligned ring members.

FIG. 17 is a schematic cross-section of the expansion jig, illustrating a ring member held by the expansion jig.

DETAILED DESCRIPTION OF THE PREFERRED EMBODIMENTS

Figure 5:
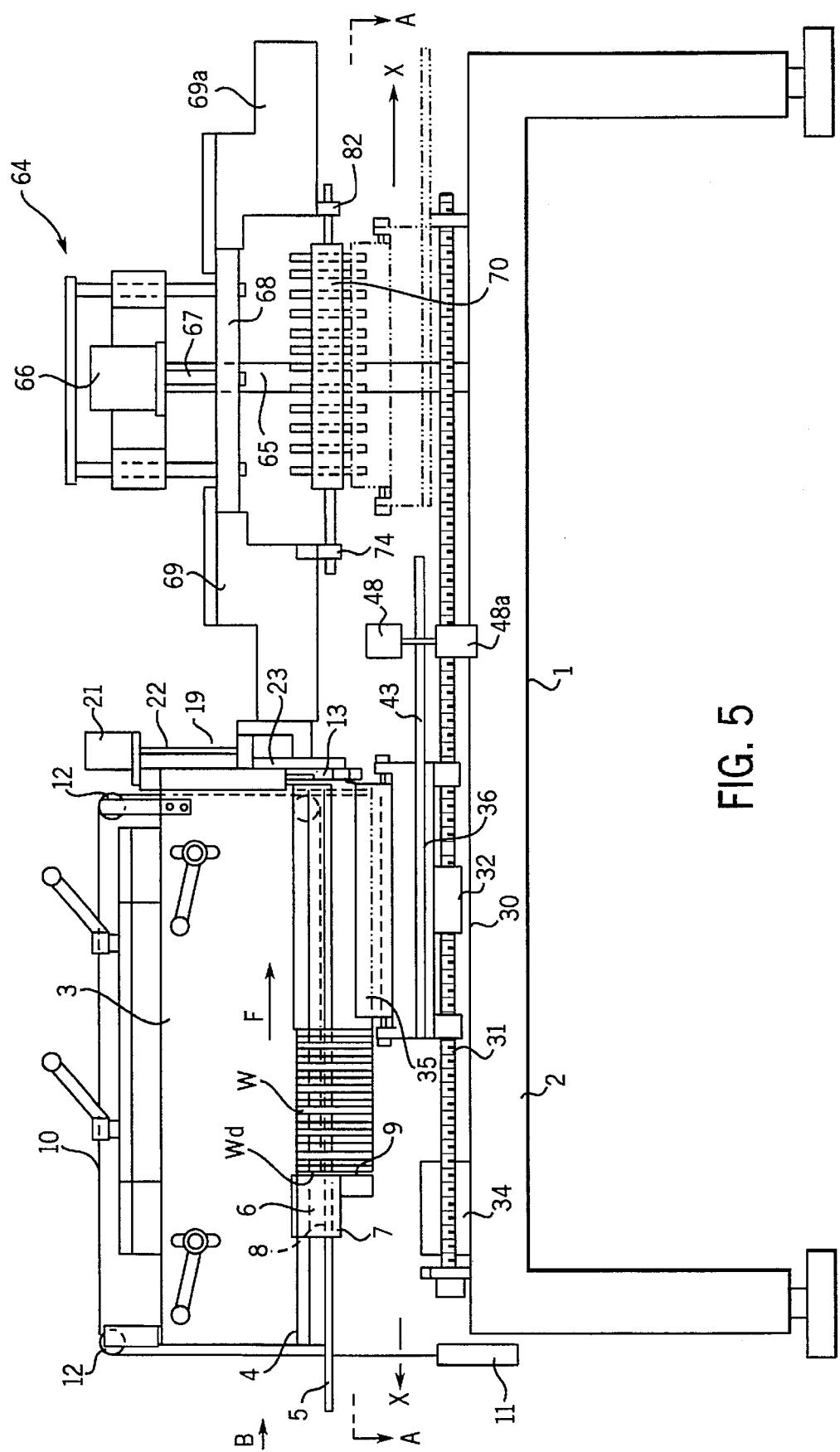
FIG. 5 is a front elevational view of an alignment apparatus constructed in accordance with the present invention.
Figure 7:
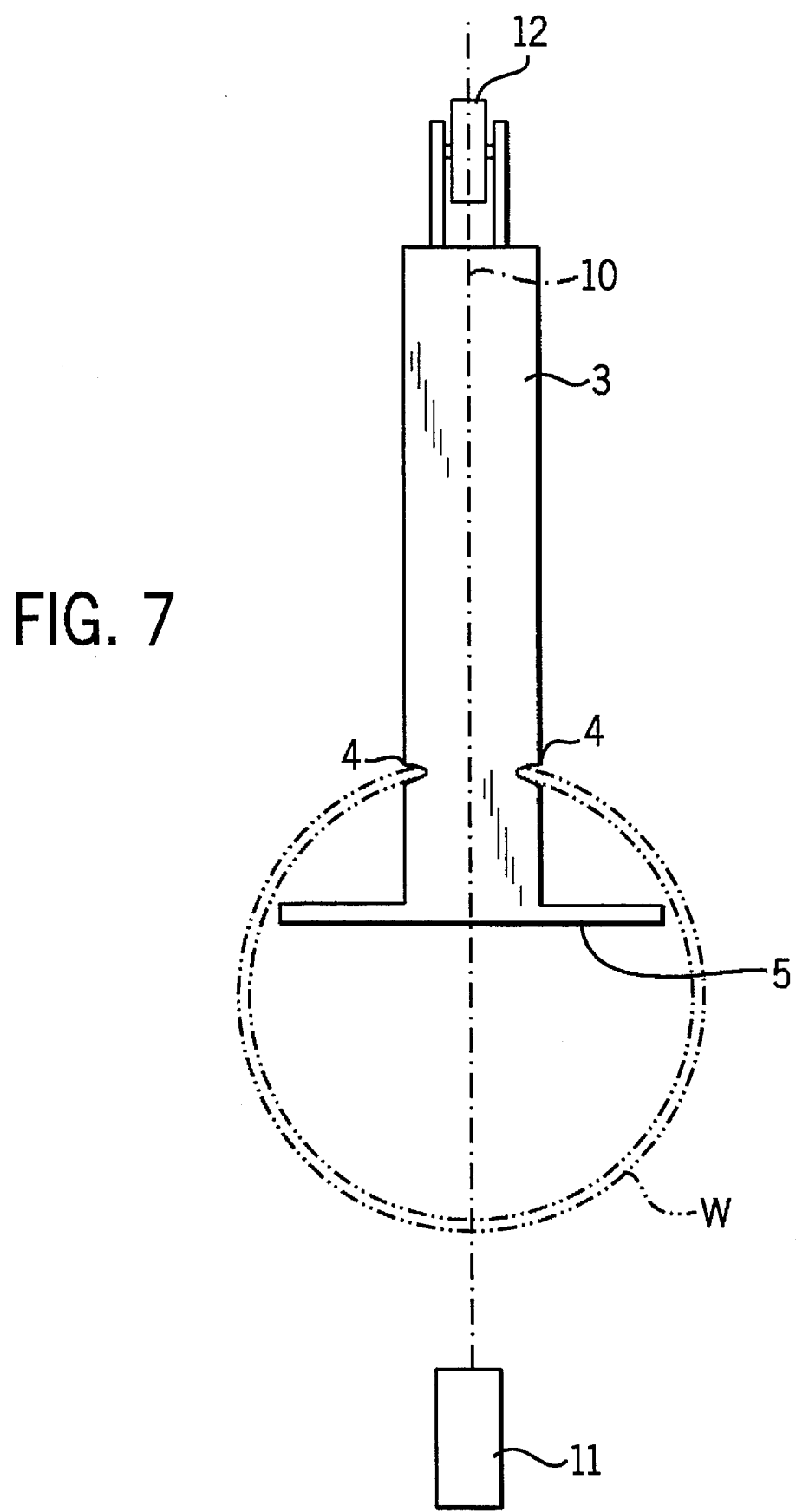
FIG. 7 is a view as viewed in the direction of arrow B in FIG. 5.

Referring first to FIG. 5, there is shown an apparatus 1 for aligning ring members W, which is constructed in accordance with the present invention. The alignment apparatus 1 comprises a work bench 2 having a working axis X—X in the longitudinal direction and a vertical plate-like work support 3 located above one end of the working axis X—X and extending therealong, the work support 3 being movable for adjustment of the vertical position thereof. As can be best seen from FIG. 7, the work support 3 includes slide grooves 4 and 4a formed in the lower portion thereof on the opposite sides and extending along the length of the work support 3 in the direction of the working axis X—X. The slide grooves 4 and 4a receive the ends Wb of each of the ring members W at the gap Wa thereof. The work support 3 also includes a plate-like slide plate 5 formed in the lower end thereof below the slide grooves 4 and 4a. The slide plate 5 is located to extend horizontally along the working axis X—X.

The slide plate 5 runs through a thrust block 6 slidably mounted thereon in the working axis X—X. The thrust block 6 comprises a block body 7 formed of a low-friction and high-wear-resistant material such as Nylon or Teflon. The block body 7 includes guide grooves 8 formed therein at the upper part and receiving the slide plate 5 at the opposite side edges thereof. The block body 7 also includes a lower part of substantially semi-circular cross-section which is of such a dimension not extending outwardly from the outer periphery of the respective ring members W. The lower part of the block body 7 has a front thrust surface 9 facing the ring members W in the working axis X—X of the block body 7 and adapted to engage the end face Wd of the rearwardmost ring member W in the array of ring members.

The thrust block 6 is connected to a weight 11 through a wire 10. The thrust block 6 is slidably biased forwardly in the direction of the working axis X—X under the influence of the weight 11 to apply a thrust force F to the array of ring members W hung from the work support 3 at the slide grooves 4 and 4a at all times.

The wire 10 is guided around pulleys 12 on the work support 3.

Although this embodiment has been described as to the weight 11 connected to the thrust block 6 to slide it along the slide grooves 4 and 4a, the present invention is not limited to such an arrangement, but may be similarly applied to any other rectilinear motion mechanism such as cylinder-piston mechanism or ball-screw mechanism.

Figure 11:
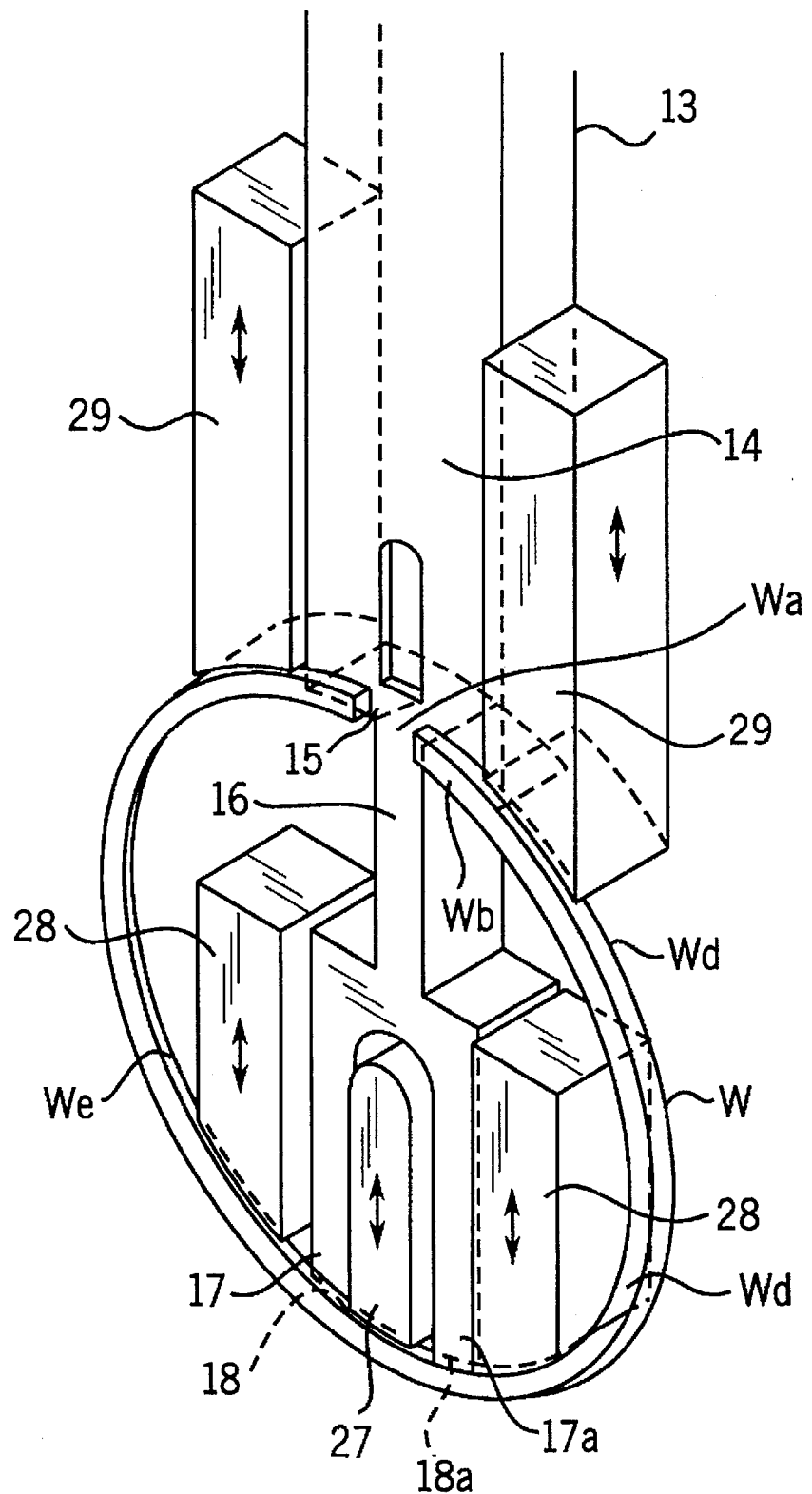
FIG. 11 is a perspective view of the work pushing-out mechanism shown in FIG. 8.
Figure 12:
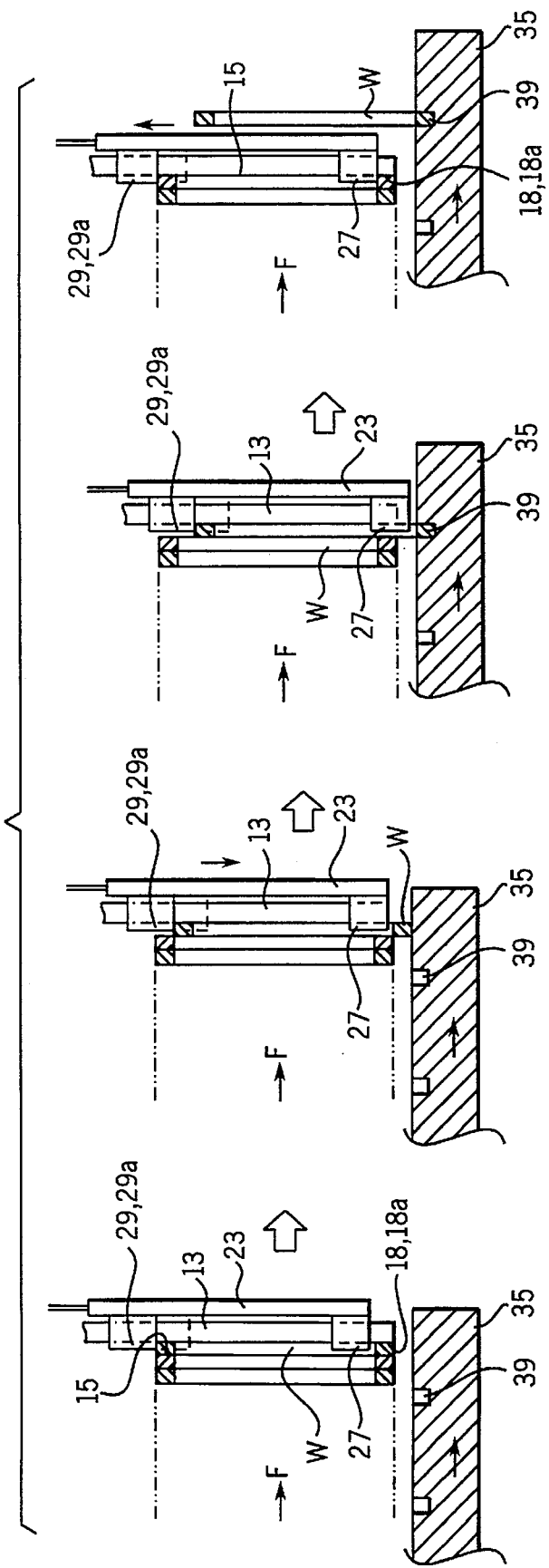
FIG. 12 is a schematic view illustrating the operation of the work pushing-out mechanism.
Figure 14:
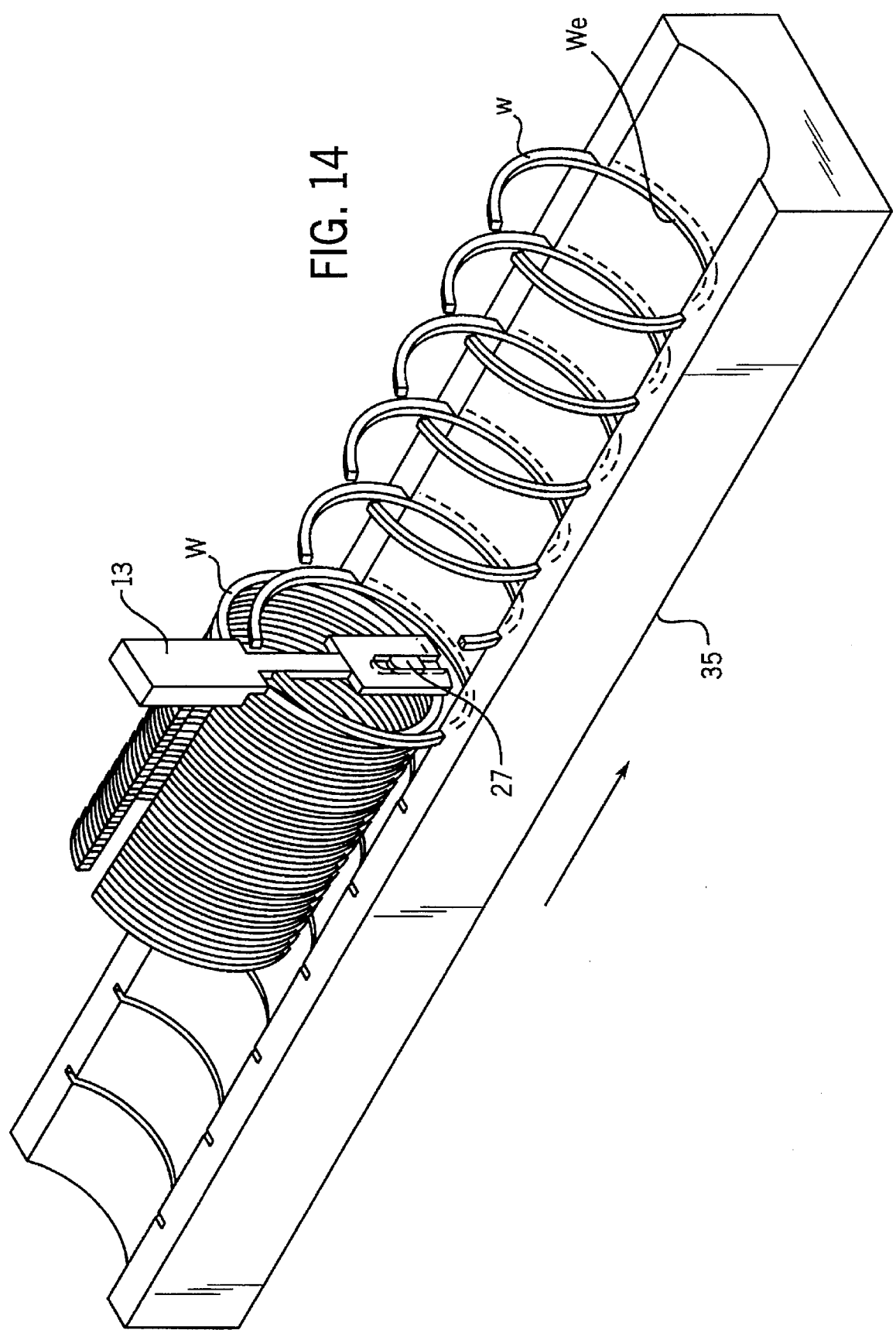
FIG. 14 is a perspective view, partially omitted, of the work pushing-out mechanism, illustrating the array of aligned ring members.

A stopper 13 is disposed at a position opposed to the forwardmost ring member W in the array hung from the work support 3. As can be best seen from FIGS. 8 and 11, the stopper 13 comprises a base 14 fixed to the forward end 3a of the work support 3, an upper engagement face 15 formed in the base 14 at the lower end thereof and adapted to engage the gap Wa of the respective hung ring members W, a connection piece 16 extending downwardly from the lower end of the base 14 past the upper engagement face 15, and a pair of lower bifurcated engagement pieces 17 and 17a extending downwardly from the lower end of the connection piece 16. The lower faces of the lower engagement pieces 17 and 17a directed in the same direction as in the upper engagement face 15 provide lower engagement faces 18 and 18a which are adapted to engage the end face Wd of each of the ring members W at the central and lower portion thereof.

Figure 10:
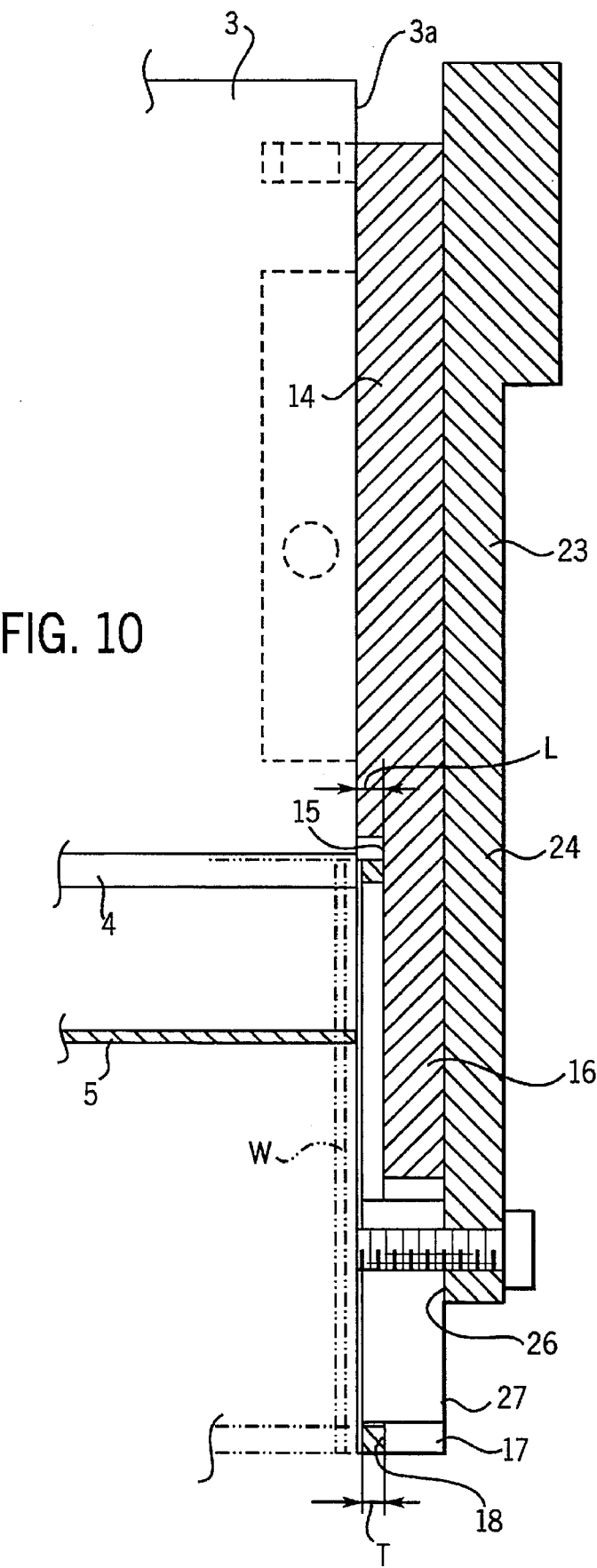
FIG. 10 is a cross-sectional view of the work pushing-out mechanism shown in FIG. 8.

As shown in FIG. 10, the upper and lower engagement faces 15 and 18, 18a of the stopper 13 are located spaced away from the forward end face 3a of the work support 3 by a distance L which is represented by $T<L<2!\_T$ wherein T is the thickness of a ring member W. Thus, the ring member W can freely fall from between the forward end face 3a of the work support 3 and the stopper 13 when the thrust force F is not applied to the array of ring members W against the upper and lower engagement faces 15 and 18, 18a of the stopper 13.

Turning again to FIGS. 5 and 8, a work pushing-out mechanism 19 is provided to force the ring member W in the downward direction when it is held against its free fall through engagement with the upper and lower engagement faces 15 and 18, 18a of the stopper 13. The work pushing-out mechanism 19 comprises a pushing-out cylinder 21 located forwardly from the forward end 3a of the work support 3 in the working axis X—X. The cylinder 21 includes a rod 22 extending downwardly in the vertical direction. The rod 22 is connected to a push pawl support plate 23 such that the latter can be moved in the vertical direction under the action of the pushing-out cylinder 21.

Figure 8:
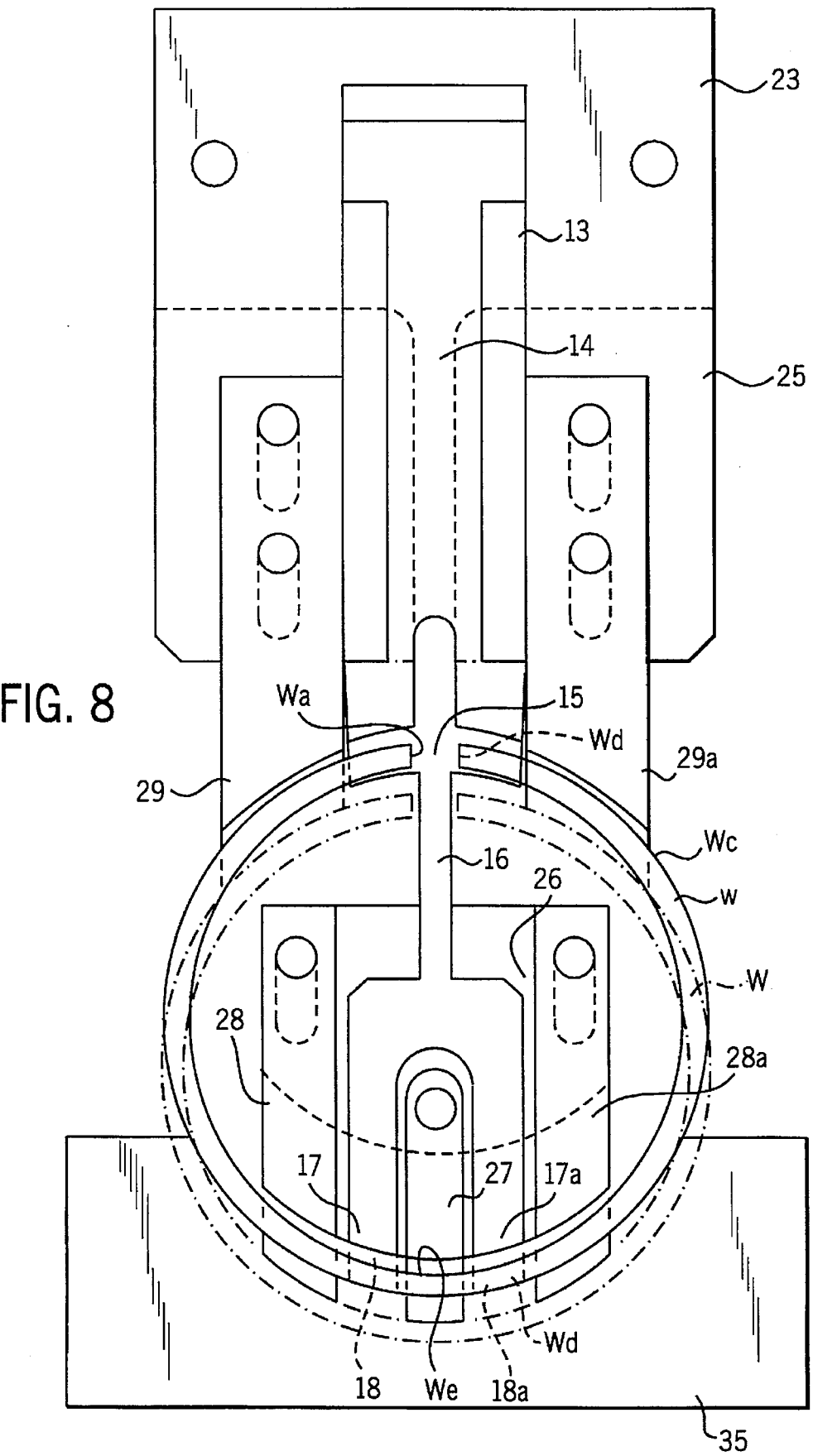
FIG. 8 is a front view of the work pushing-out mechanism.
Figure 9:
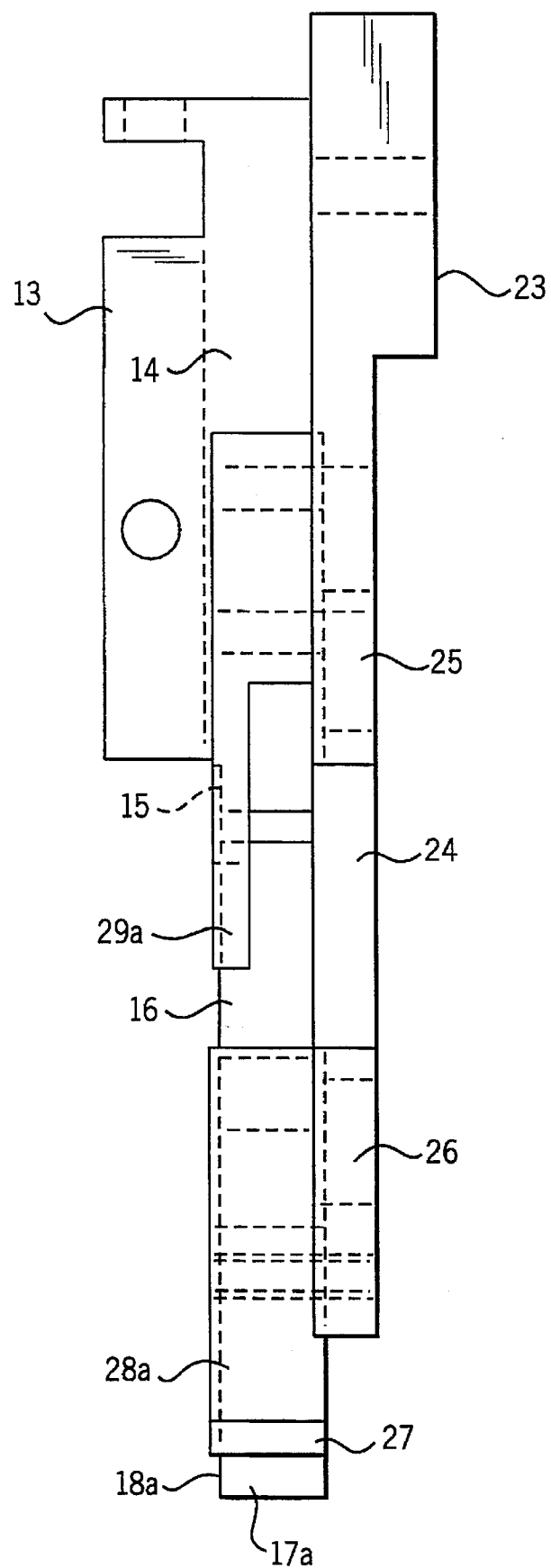
FIG. 9 is a side view of the work pushing-out mechanism shown in FIG. 8.

As can been best seen from FIGS. 8 to 10, the push pawl support plate 23 includes a connection shaft 24 movable through the gap Wa of the respective ring members W and upper and lower mounting parts 25, 26 formed in the connection shaft 24 respectively at the upper and lower ends. The central and lower part of the lower mounting part 26 includes a main push pawl 27 mounted thereon to extend in the downward direction. The main push pawl 27 has its lower end engaging the lowermost part of the inner periphery We of the ring member W and being located for vertical movement between the lower engagement pieces 17, 17a of the stopper 13.

The push pawl support plate 23 further includes lower auxiliary pawls 28, 28a located on the opposite sides of the main push pawl 27 in the lower mounting part 26 and extending therefrom in the downward direction. The lower ends of the lower auxiliary pawls 28, 28a are inwardly spaced from the inner periphery We of the ring member W with a slight distance. The push pawl support plate 23 further includes upper auxiliary pawls 29, 29a located on the opposite sides of the upper mounting part 25 and extending therefrom in the downward direction. The lower ends of the upper auxiliary pawls 29, 29a are outwardly spaced from the outer periphery Wc of the ring member W with a slight distance.

The main push pawl 27, lower auxiliary pawls 28, 28a and upper auxiliary pawls 29, 29a are extended from the upper and lower engagement faces 18, 18a of the stopper 13 by a distance smaller than the thickness T of the ring member W such that these pawls will engage, at their lower ends, the inner and outer peripheries We, Wc of the ring member W prevented from freely falling through engagement of the upper and lower engagement faces 18, 18a.

Figure 6:
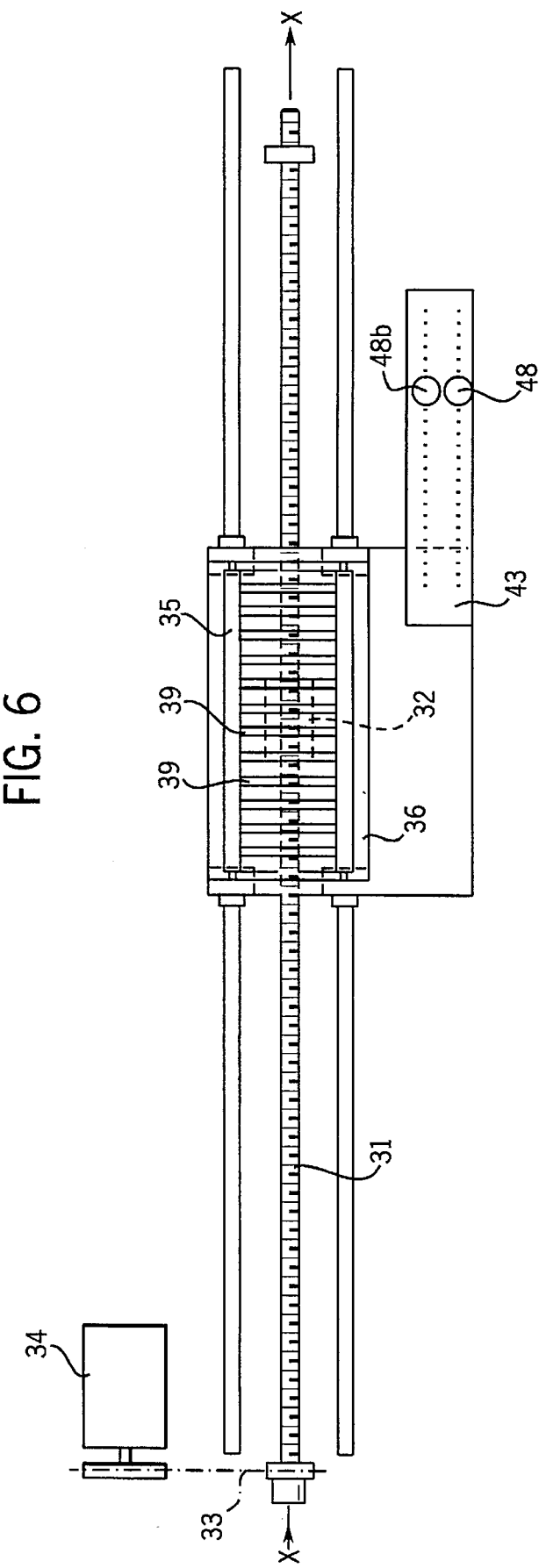
FIG. 6 is a simplified view as viewed in the direction of arrow A—A in FIG. 5.

There is further provided a mechanism 30 for aligning the ring members W. As can be best seen from FIGS. 5 and 6, the ring alignment mechanism 30 comprises a ball screw 31 rotatably mounted thereon and extending between the opposite ends of the work bench 2 directly below the work support 3 along the working axis X—X. The ball screw 31 is threadedly engaged by a mover 32. The ball screw 31 is operatively connected to a drive motor 34 through a belt 33. When the drive motor 34 is energized, the mover 32 can be moved fore and aft along the working axis X—X.

Figure 13:
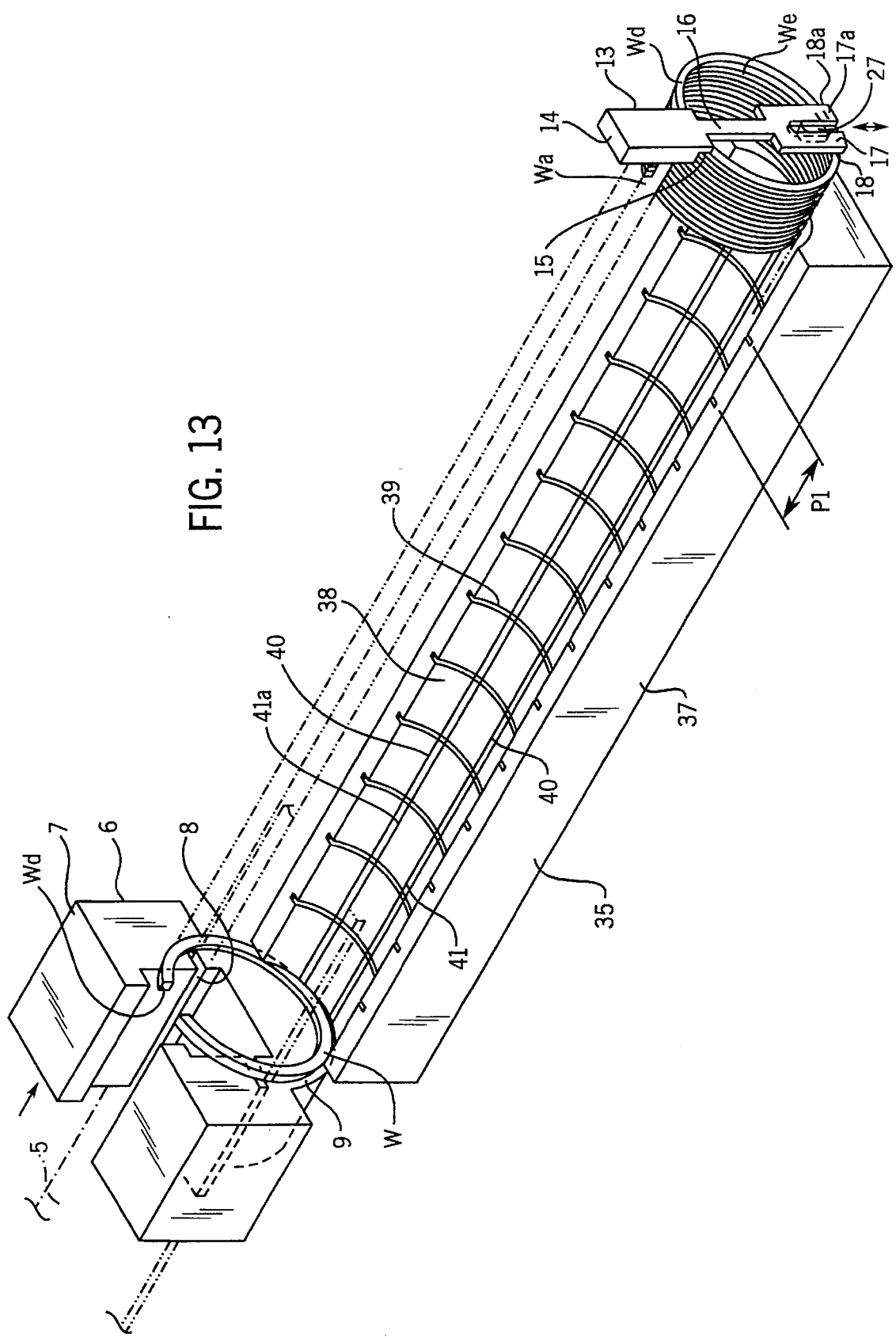
FIG. 13 is a perspective view, partially omitted, of the work pushing-out mechanism, illustrating the array of aligned ring members.

An alignment block 35 is mounted on the mover 32 through a movable base 36. The alignment block 35 includes a block body 37 of substantially rectangular configuration which is formed of a low-friction and high-wear-resistant material such as Nylon or Teflon. As can be best seen from FIG. 13, the block body 37 includes a recess 38 conforming to the lower arcuate shape of the ring member W and formed on the top thereof to extend along the length of the block body 37. The recess 38 includes a number of arcuated grooves 39 formed therein and spaced away from one another with a pitch P1 in the longitudinal direction. Each of the arcuated grooves 39 is dimensioned to receive a ring member W at the lower part thereof. The alignment block 35 is located to have its longitudinal axis conforming to the working axis X—X and movable directly below the array of the ring members W hung from the work support 3.

The recess 38 of the alignment block 35 may include longitudinally extending grooves 41, 41a formed therein and adapted to receive resilient string-like cushion members 40. Alternatively, the recess 38 of the alignment block 35 may be of a substantially V-shaped cross-section.

A reciprocation control apparatus 42 for controlling the vertical motion of the pushing-out cylinder 21 will now be described particularly with reference to FIGS. 1 to 4.

The apparatus 42 comprises a manifold 43 comprising a rectangular plate-like manifold body 44. The manifold body 44 includes control port arrays 47 and 47a which comprises a number of delivery ports 45 formed therethrough and arranged in line along the opposite smaller sides of the manifold body 44 and a number of exhaust ports 46 also formed in curved line through the manifold body 44, these ports being alternately arranged on arrangement lines L.

The pitch P2 between adjacent delivery or exhaust ports 45 or 46 is equal to one-half of the pitch P1 in the grooves 39. The control port arrays 47 and 47a are alternated with each other such that one exhaust port 46 in one of the control port arrays 47, 47a is located between two delivery ports 45 in the other control port array as viewed in the transverse direction. The manifold 43 is horizontally positioned sideways from the movable base 36 with the longitudinal axis conforming to the working axis X—X.

Control cylinders 48, 48a, 48b and 48c are provided to deliver air to or exhaust air from the cap or head side of the pushing-out cylinder 21. Each of the control cylinders 48, 48a, 48b and 48c comprises a cylinder body 49, a piston part 50 slidably received in the cylinder body 49 and a piston rod part 52 including an integral rod 51 extending from one end of the piston part 50 and formed of a low-friction and high-wear-resistant material such as Nylon or Teflon. The piston part 50 includes a connection passage 53 formed therethrough to extend from the outermost end of the rod 51 of the piston rod part 52 to the outer periphery of the piston part 50.

The cylinder body 49 of each of the control cylinder 48, 48a, 48b and 48c includes a bypass passage 54 adapted to communicate with the connection passage 53 of the piston rod part 52 when the piston rod part 52 is moved to its outermost position.

Figure 1:
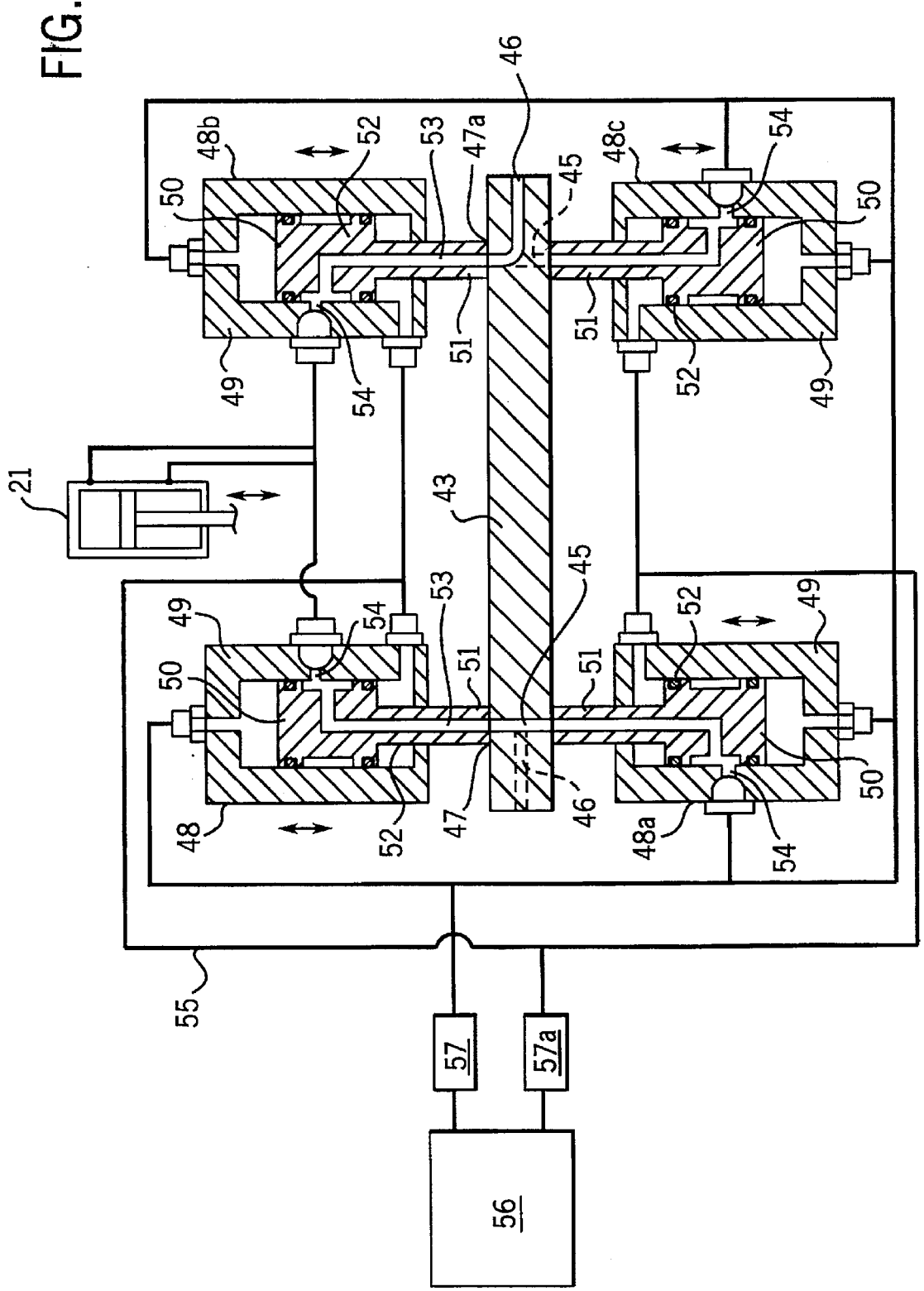
FIG. 1 is a schematic diagram of a cylinder reciprocation control apparatus constructed in accordance with the present invention.
Figure 2:
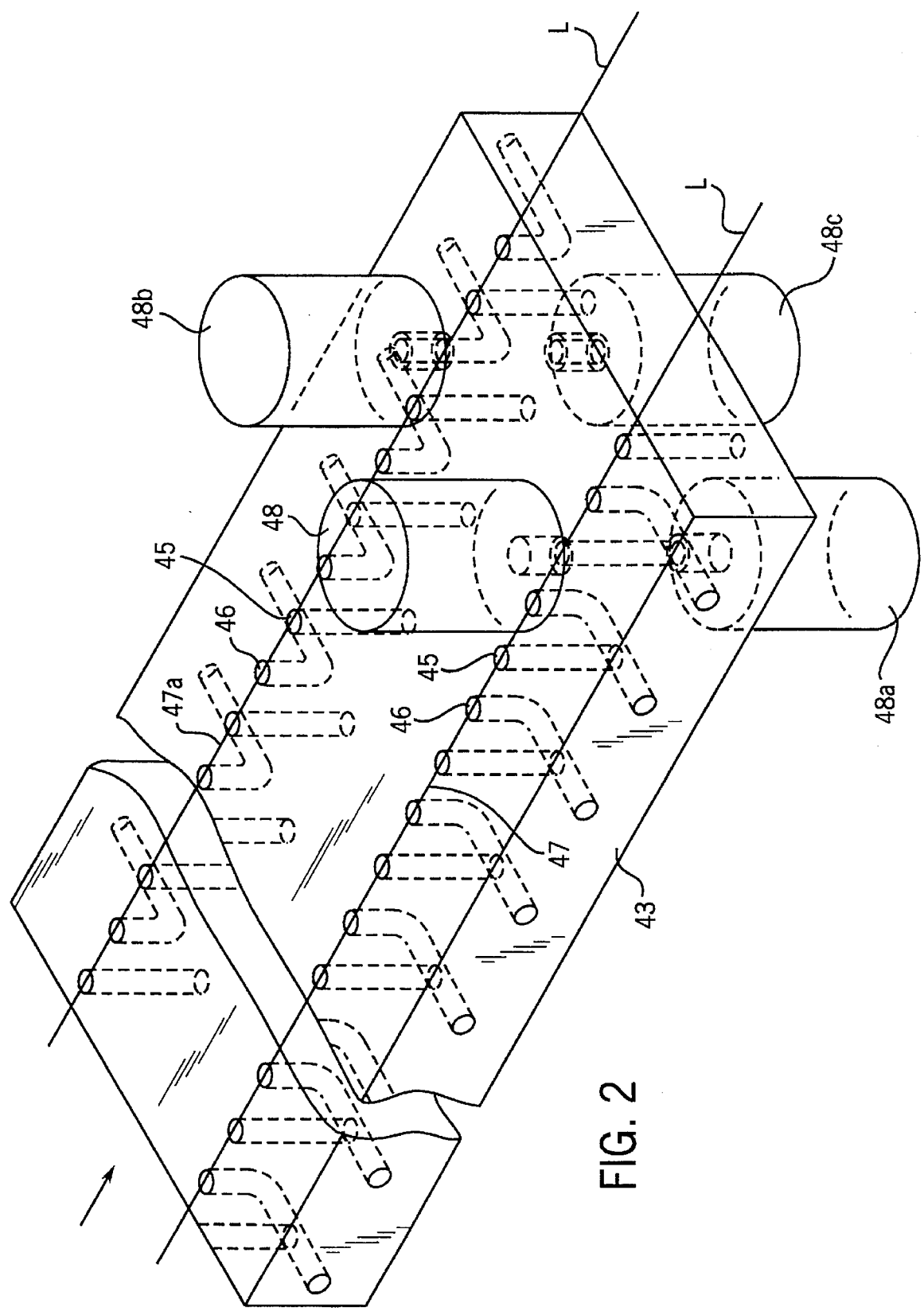
FIG. 2 is a schematic and perspective view of the manifold and control cylinders.

As best shown in FIG. 2, the control cylinders 48, 48a, 48b and 48c are symmetrically arranged to position directly above and below the arrangement lines L of the control port arrays 47, 47a of the manifold 43 in a direction perpendicular to the working axis X—X. The rods 51 of the control cylinders vertically opposed to each other at the same arrangement line L engage, at their outermost ends, the top and bottom of the manifold 43, respectively. When the corresponding control cylinder are actuated to extend, the outermost ends of these rods 51 will engage the top and bottom of the manifold 43 at the same arrangement line L.

The control cylinders 48, 48a, 48b and 48c may be arranged such that the control cylinders associated with each other in the direction perpendicular to the working axis X—X are offset from each other by the pitch P2 in the longitudinal direction when the delivery ports in one of the control port arrays 47, 47a are arranged to align with those of the other control port array, unlike the aforementioned arrangement of delivery and exhaust ports.

The relationship between the diameter of the delivery and exhaust ports 45, 46, the diameter of the connection ports 53 in the piston rod parts 52 and the pitch P1 are set such that the pair of vertically opposed control cylinders (48 and 48a or 48b and 48c in the illustrated embodiment) can be connected or disconnected to each other without interference.

The pushing-out cylinder 21 is operatively connected to the respective control cylinders 48, 48a, 48b and 48c through a piping 55 as follows: The first pair of vertically opposed control cylinders 48 and 48a about one of the arrangement line L relating to the control port array 47 are connected, at their cap sides, to an air supply 56 through an electromagnetic valve 57 via the piping 55. The lower control cylinder 48a is also connected, at its bypass port 54, to the air supply 56 through the electromagnetic valve 57 via the piping 55. The head sides of the control cylinders 48 and 48a are also connected to the air supply 56 through the electromagnetic valve 57a via the piping 55 while the bypass port 54 of the upper control cylinder 48 is connected to the cap side of the pushing-out cylinder 21 through the other piping.

On the other hand, similarly, the other pair of vertically opposed control cylinders 48b and 48c about the arrangement line relating to the other control port array 47a are connected, at their cap sides, to the air supply 56 through the electromagnetic valve 57 via the piping 55. The bypass port 54 of the lower control cylinder 48c is also connected to the air supply 56 through the electromagnetic valve 57 via the piping 55. The head sides of the control cylinders 48b and 48c are connected to the air supply 56 through the electromagnetic valve 57a via the piping 55 while the bypass port 54 of the upper control cylinder 48b is connected to the head side of the pushing-out cylinder 21 through the other piping.

Figure 3:
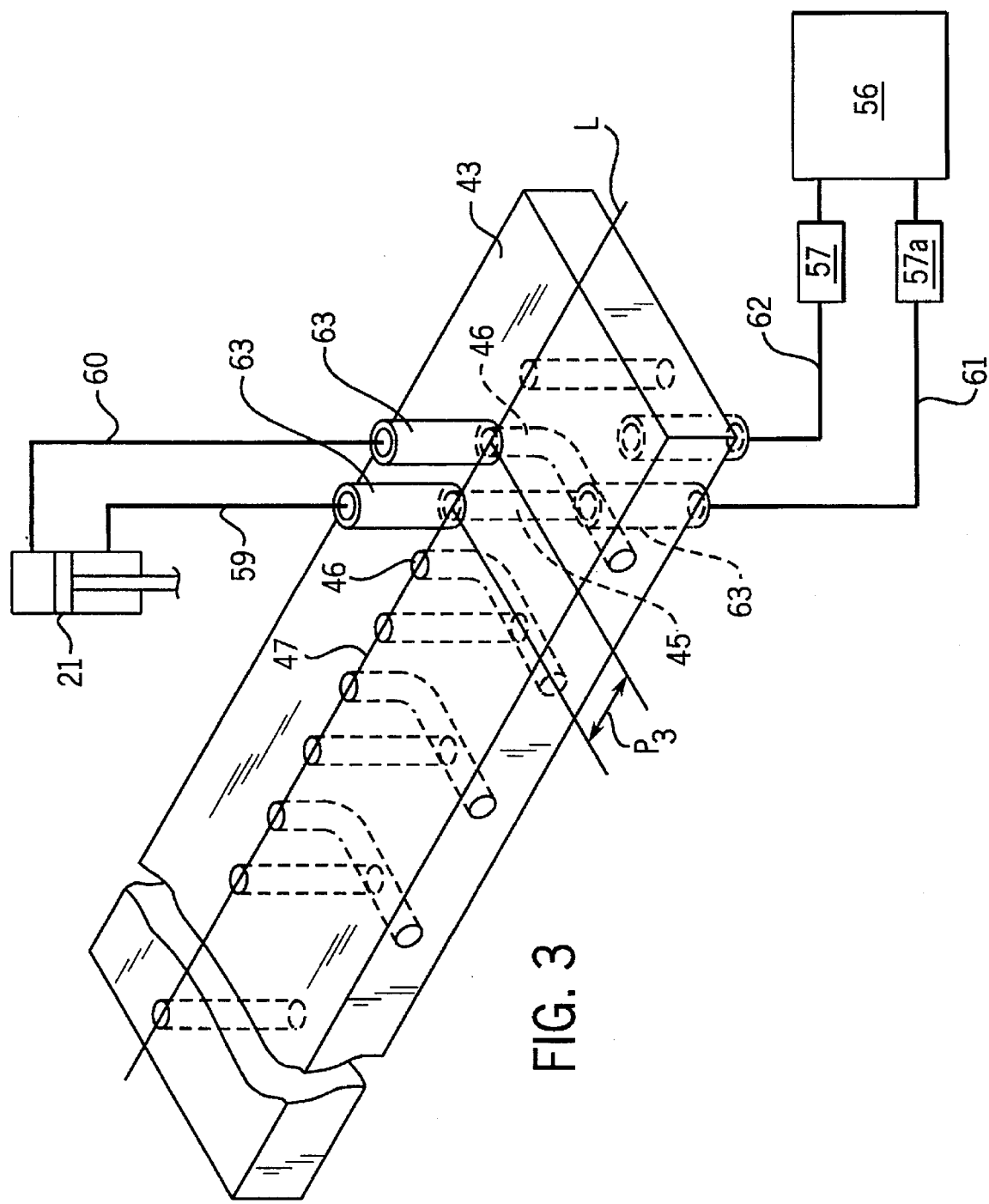
FIG. 3 is a schematic and perspective view of another embodiment of a cylinder reciprocation control apparatus constructed in accordance with the present invention.
Figure 4:
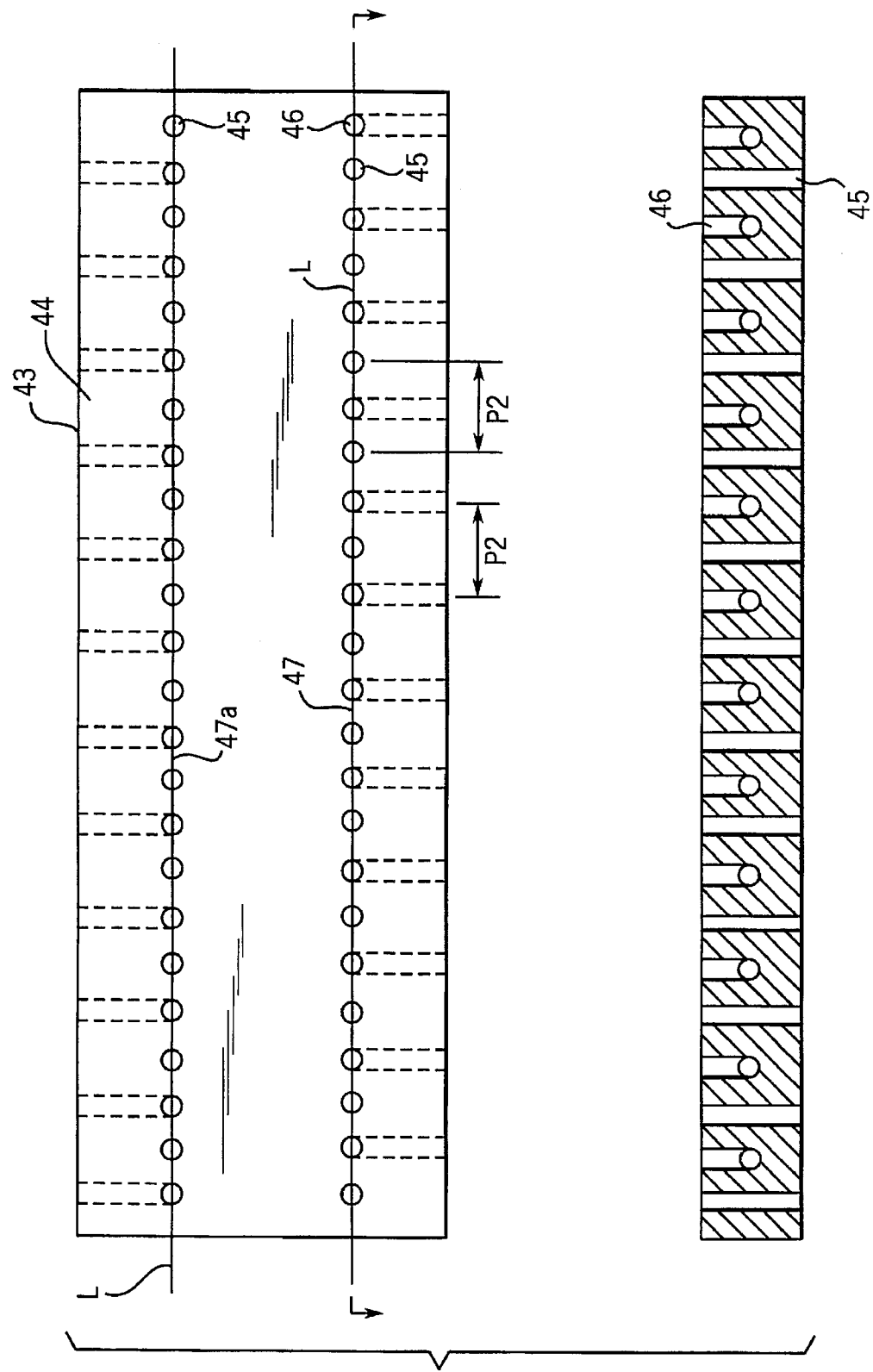
FIG. 4 is a plan and cross-sectional view of the manifold.

Another embodiment of the reciprocation control apparatus 42 is shown in FIG. 3 in which the manifold 43 to be mounted on the movable base 36 is shown to include a control port array 47. The control port array 47 includes delivery and exhaust ports 45, 46 alternately arranged in a single arrangement line L. The pushing-out cylinder 21 is connected, at its head side, to a first delivery/exhaust pipe 59. The cap side of the pushing-out cylinder 21 is connected to a second delivery/exhaust pipe 60. On the other hand, an air supply 56 is connected to first and second delivery pipes 61, 62 through electromagnetic valves 57, 57a, respectively.

The tip of the first delivery/exhaust pipe 59 is aligned with the tip of the first delivery pipe 61 through the manifold 43. The tips of these pipes 59 and 61 operatively engage the top and bottom of the manifold 43 at the arrangement line L. On the other hand, the tip of the second delivery/exhaust pipe 60 is aligned with the tip of the second delivery pipe 62 through the manifold 43. The tips of these pipes 60 and 62 operatively engage the top and bottom of the manifold 43 at the arrangement line L.

The pitch P3 between the first aligned pipes 59, 61 and the second aligned pipes 60, 62 in the direction of the working axis X—X is equal to the pitch P2.

On the tips of the first and second pipes 59, 60, 61 and 62 there are mounted hollow slide members 63 which are formed of a low-friction and high-wear-resistant material such as Nylon or Teflon. These slide members 63 operatively engage the manifold 43 through any suitable mechanism at all times.

Turning again to FIG. 5, there is shown a work unloading mechanism 64 which is disposed on the work bench 2 at the opposite end thereof. The work unloading mechanism 64 comprises a support stay 65 upstanding on the work bench 2 and an unloading cylinder 66 mounted on the support stay 65. The unloading cylinder 66 includes a rod 67 extending downwardly therefrom and connected to a horizontal support bar 68 which extends along the working axis X—X. The opposite ends of the support bar 68 support plate-like guide plates 69 and 69a each having such a thickness that the guide plate is movable through the gap Wa of the ring member W.

Figure 16:
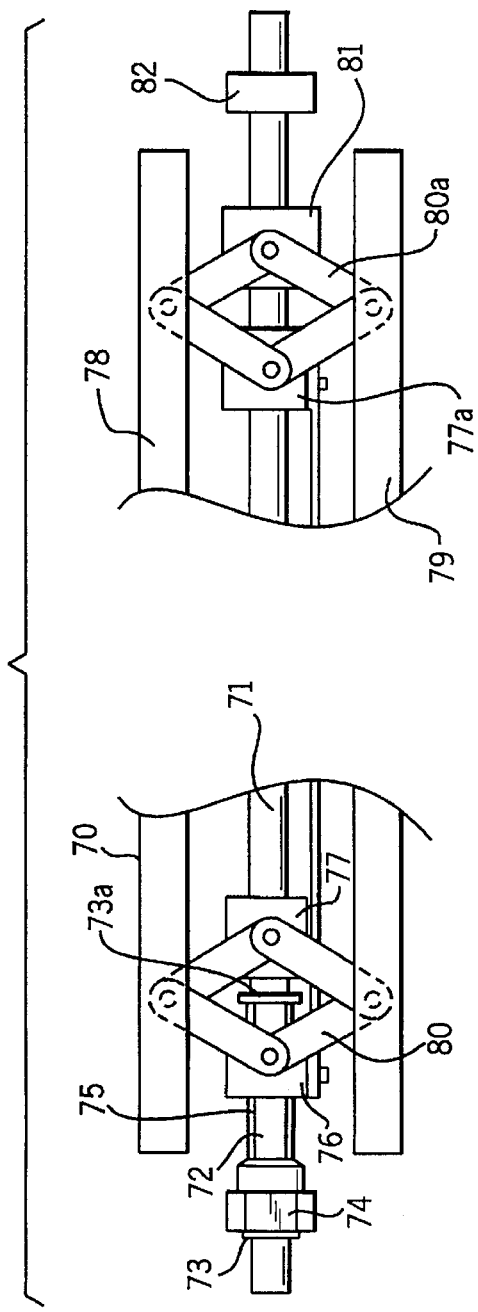
FIG. 16 is a front view of the expansion jig.
Figure 18:
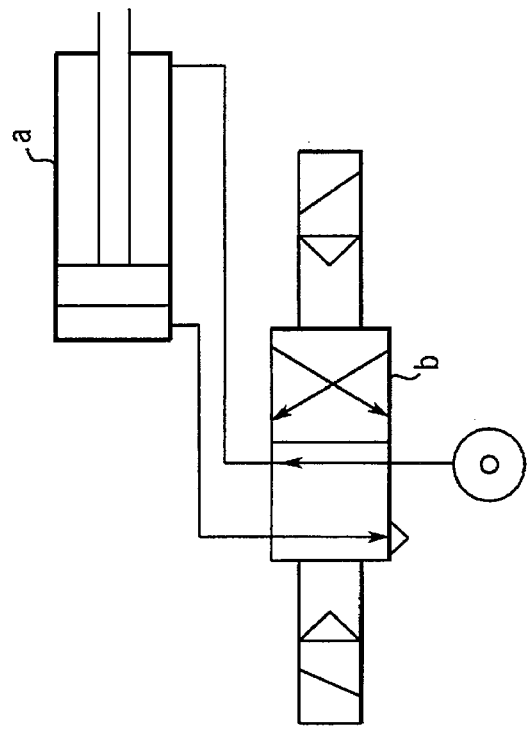
FIG. 18 is a circuit of the prior art for controlling the reciprocation in a cylinder.

An expansion jig 70 is supported between the guide plates 69 and 69a. As shown in FIG. 16, the expansion jig 70 includes a rod member 71 on one end of which an actuating tube 72 is rotatably mounted. The axial movement of the actuating tube 72 is limited by stops 73 and 73a on the rod member 71.

The actuating tube 72 includes a wrench engagement part 74 formed thereon at one end and external threads 75 formed on the outer periphery of the actuating tube 72. A screw block 76 threadedly engages the external threads 75 on the actuating tube 72. The rod member 71 further includes an anchoring block 77 which is fixedly mounted thereof adjacent to the opposite end of the actuating tube 72.

As can be best seen from FIG. 17, the rod member 71 is located between a pair of expansion pieces 78 and 79 which are of substantially U-shaped cross-section. The expansion pieces 78 and 79 are connected to the screw and anchoring blocks 76, 77 through a linkage 80.

At the opposite end of the rod member 71, a slide block 81 is slidably mounted on the rod member 71 while an anchoring block 77a is fixedly mounted on the rode member 71. The anchoring and slide blocks 77a, 81 are connected to expansion pieces 78 and 79 through a linkage 80a.

A square block 82 is further fixedly mounted on the rod member 71. As shown in FIG. 17, a holding sleeve 83 is adapted to be interposed between the expansion jig 70 and the ring member W. The holding sleeve 83 is formed by an overlappedly wound metal sheet which is expandable in diameter. A protection sleeve 84 is adapted to be interposed between the holding sleeve 83 and the ring member W. The protection sleeve 84 is formed by an overlappedly wound water absorption sheet such as paper sheet which is expandable in diameter.

The operation of the ring alignment apparatus according to the present invention will now be described.

First of all, a plurality of ring members W are hung from the work support 3 by engaging each of the ring members W at its opening Wa into the slide grooves 4 and 4a. The thrust block 6 is then inserted into the guide grooves 8 to cause the thrust face 9 of the thrust block 6 to engage the rearward end of the ring member array. As the thrust block 6 is moved forwardly along the working axis X—X under the influence of the weight 11, the forward end Wd of the ring member array is urged against the upper and lower engagement faces 18, 18a of the stopper 13. Thus, the forwardmost ring member W in the ring member array is held against the free fall under the action of the thrust force F.

When the drive motor 34 is energized to rotate the ball screw 31 to move the mover 32 screwed over the ball screw 31 forwardly along the working axis X—X at any set speed, the alignment block 35 as well as the manifold 43 are moved so that the reciprocation control device 42 reciprocates the rod 22 in the pushing-out cylinder 21. The main push pawl 27 mounted on the pawl support plate 23 connected to the rod 22 urges the inside We of the forwardmost ring member W to move it into the corresponding one of the grooves 39 in the alignment block 35. The other ring members W are sequentially fitted into the grooves 39 of the alignment block 35 in such a manner.

When a ring member W is urged downwardly, it is firmly held with respect to lateral motion through the lower and upper auxiliary pawls 28, 28a and 29, 29a. Therefore, the ring member W can be moved downwardly in a stable manner.

As air pressure is supplied to the cap sides of the control cylinders 48, 48a, 48b and 48c by opening the electromagnetic valve 57 in the pipeline 55, the piston rod parts 52 are extended toward the manifold 43 to engage the tips of the rods 51 of the piston rod parts 52 with the control port arrays 47, 47a in the manifold 43 on the arrangement lines L.

When the alignment block 35 and manifold 43 are moved forwardly along the working axis X—X to locate the delivery ports 45 in the control port array 47 between the tips of the rods 51 of the control cylinder pair 48, 48a, the air pressure is supplied from the air supply 56 through the connection port 53 of the piston rod part 52 of the lower control cylinder 48a, the delivery port 45 and the connection port 53 of the piston rod part 52 of the upper control cylinder 48 to the cap side of the pushing-out cylinder 21. At the same time, The exhaust ports 46 in the other control port array 47a are also located between the tips of the rods 51 of the other control cylinder pair 48b, 48c. As a result, the head side of the pushing-out cylinder 21 is externally exhausted through the connection port 53 of the piston rod part 52 of the upper control cylinder 48b and the exhaust port 46. Therefore, the tog 22 of the pushing-out cylinder 21 is moved downwardly to cause the main pawl 27 mounted on the pawl support plate 23 to urge the inner periphery We of the ring member W.

When the manifold 43 is moved forwardly along the working axis X—X with the alignment block 35, the flow of air is reversed to move the rod 22 of the pushing-out cylinder 21 upwardly to return the system to its original state. Such a cycle is repeated each time when the alignment block 35 is moved forwardly with the manifold 43. In such a manner, a number of ring members W will be fitted into the respective grooves 39 in the alignment block 35 and held at their upstanding positions.

When it is wanted to move the alignment block 35 rearwardly, the head sides of the control cylinders 48, 48a, 48b and 48c are supplied with air pressure to move the piston rod parts 52 upwardly, so that the tips of the rods 51 will be separated from the manifold 43. This reduces the wear in the tips of the rods 51.

The embodiment shown in FIG. 3 is not further described since it is only different from the aforementioned embodiment in that in the embodiment of FIG. 3, the tips of the pipes 59, 60, 61 and 62 have previously been engaged by the manifold 43.

To unload the ring members W held upstanding in the alignment block 35, the alignment block 35 is moved to the work unloading mechanism 64 wherein The expansion jig 70 is placed between the guide plates 69 and 69a through the ring member array. Thereafter, the wrench engagement part 74 is engaged and rotated by any wrench to rotate the actuating tube 72 and to move the screw block 76 toward the anchoring block 77. As a result, the linkages 80 and 80a are actuated to move the expansion pieces 78 and 79 so that the spacing therebetween is increased.

The moved expansion pieces 78 and 79 engage the inner peripheries We of the ring members W to expand the ring members W. The ring members W are maintained at their expanded state through their own tension.

The ring members W are then painted by a synthetic resin containing a solid lubricant which is sprayed through a painting gun.

When the spray is carried out in a direction slant the end faces Wd and outer peripheries Wc in the ring members W while the painting gun being moved along the ring member array and if at lease one of the end faces Wd of each ring member W is painted, the thickness of the paint layer becomes uniform without creation of any paint flash.

According to the present invention, the plate-like manifold 43 includes a number of delivery ports 45 formed linearly therethrough and a number of exhaust ports 46 formed curvedly therethrough. The delivery and exhaust ports 45, 46 are arranged in an arrangement line (arrangement lines) L. Such a manifold 43 is moved along the arrangement line (arrangement lines) L. The pushing-out cylinder 21 and air supply 56 are further provided. The ends of the air delivery/exhaust pipe means to the head and cap sides of the pushing-out cylinder 21 are engaged by the top of the manifold 43 at the arrangement line (arrangement lines) L while the ends of two air delivery pipe means of the air supply 56 are engaged by the bottom of the manifold 43 along the arrangement line (arrangement lines) L in alignment with the ends of the air delivery/exhaust pipe means. Thus, the delivery port 45 is located between the end of the air delivery/exhaust pipe means on the head side and the end of one of the air delivery pipe means while at the same time the exhaust port 46 is located between the end of the air delivery/exhaust pipe means on the cap side and the end of the air delivery means. Therefore, the air pressure can alternately be supplied to or exhausted from the head and cap sides of the pushing-out cylinder 21 only by moving the manifold 43 between the air delivery/exhaust pipe means and the air delivery pipe means which are aligned with each other. This provides a very simple mechanism. Since only the manifold 43, air delivery/exhaust pipe means and air delivery pipe means are slidable, the durability can greatly be improved.

The reciprocation repeating cycle can easily be varied by adjusting the speed of movement in the manifold 43. Since the manifold 43 is only moved in one direction, time required to switch the direction of reciprocation in the cylinder is reduced to about 0.5 seconds. The prior art would require about two seconds to switch the direction of reciprocation in a cylinder through a solenoid, poppet or spool as in the electromagnetic valve. Further, the reciprocation repeating cycle can mechanically be synchronized with the pitch in the delivery and exhaust ports 45, 46 in the manifold 43. Since any synchronization control device as would be required by the electromagnetic valve is not required, therefore, the manufacturing cost can be reduced.

The work support 3 is disposed on the work bench 2 at one end and includes the slide grooves 4 and 4a engaged by the ring members W at their openings Wa, the slide grooves extending along the working axis X—X. There is also provided means for applying the thrust force to the ring member array to urge the ring members W hung from the slide grooves 4 and 4a forwardly along the working axis X—X and the stopper 13 for limiting the forward movement of the hung ring members W. When the thrust force is not applied to the ring member array between the stopper 13 and the forward end of the work support 3, the forwardmost ring member W in the ring member can freely fall through an opening. There are further provided means for engaging and urging the ring member array hung from the work support 3 downwardly through the reciprocation of the pushing-out cylinder 21 and the alignment block 35 including the block body 37 which includes the recess 38 formed therein at the top and extending along the length of the block member 37 and a number of grooves 39 formed in the recess and spaced away from one another with the pitch P1 in the longitudinal direction, each of the grooves adapted to receive part of a ring member W. The longitudinal axis of the alignment block 35 is the working axis X—X. The mover 32 is movable on the work bench 2 below the work support 3 along the working axis X—X and connected to the manifold 43 and the alignment block 35. Since the thrust force is applied to the ring member while the forwardmost ring member W is engaged by the stopper 13, the ring members W can positively be maintained in place. Each of the ring members W can singly be urged downwardly by the urging means. The downwardly urged ring member W can be fitted into the corresponding groove 39 in the alignment block 35. Thus, the ring members W can be held upstanding in the alignment block 35. Only by hanging the ring members W from the slide grooves 4 and 4a of the work support 3, such an alignment operation as would be done manually in the prior art can automatically be carried out. As a result, the operability can greatly be improved.

Since the urging means for engaging and downwardly urging the ring member hung from the work support 3 under the action of the pushing-out cylinder 21 is formed by the main push pawl 27 engaging the inner peripheries We of the ring member, the ring members can be aligned only by urging the inner peripheries We thereof without contact with their important portions influencing the final quality if the ring members W is piston rings.

We claim:

1. A ring alignment apparatus for use in handling a plurality of ring members, each ring member having a gap, comprising a work bench having a working axis, a work support mounted on said work bench at one end, said work support including slide groove means formed therein and extending along the working axis and operative to engage and hang a plurality of ring members at their gaps, means for applying a thrust force to an array of said ring members hung from said work support forwardly along the working axis, stopper means for limiting the forward movement of said hung ring member array, said stopper means being spaced away from the forward end of said work support with such an opening that a ring member can freely fall therethrough when the thrust force is not applied to that ring member, a reciprocation control system comprising a plate-like manifold including a number of delivery ports formed linearly therethrough and a number of exhaust ports formed curvedly therethrough, said delivery and exhaust ports being arranged on at least one arrangement line, means for moving said manifold along said arrangement line, a pushing-out cylinder, an air supply, air delivery/exhaust pipe means connected to the head and cap sides of said pushing-out cylinder, and two air delivery pipe means connected to said air supply, the ends of said air delivery/exhaust pipe means being engaged by the top of said manifold at said arrangement line, the ends of said air delivery pipe means from said air supply being engaged by the bottom of said manifold at positions corresponding to the ends of said air delivery/exhaust pipe means, said delivery and exhaust ports being arranged such that one of said delivery ports is located between the end of said air delivery/exhaust pipe means on the head side and the end of one of said air/delivery pipe means while one of said exhaust ports is located between the end of said air delivery/exhaust pipe means on the cap side and the end of the other air delivery pipe means, and said ring alignment apparatus further comprising urging means for engaging and downwardly urging the ring member under the action of the pushing-out cylinder in said reciprocation control system, an alignment block having a block body on the top of which a recess is formed to extend in the longitudinal direction and includes a plurality of grooves spaced away from one another with a pitch in the longitudinal direction, each of said grooves being operative to receive part of one of said ring members, the longitudinal axis of said alignment block being the working axis, and a mover connected to said manifold and alignment block and movable on said work bench below said work support along the working axis.

2. A ring alignment apparatus as defined in claim 1 wherein said urging means includes a main push pawl operative to engage the inner periphery of each of said ring members.

3. A ring alignment apparatus for use in handling a plurality of ring members, comprising:

a movable work support for supporting a plurality of rings;

a movement arrangement operatively interconnected with the work support for moving the work support in a first direction;

stopper structure located in alignment with the rings as supported on the work support, wherein the stopper structure includes an opening sized such that a ring member can pass therethrough;

a fluid-operated reciprocating cylinder assembly including a rod;

a ring member engagement mechanism mounted to the rod of the cylinder assembly for reciprocation therewith and including structure for engaging the endmost ring member in the plurality of ring members;

a movable ring support block disposed in alignment with the ring member engagement mechanism; and a fluid delivery and exhaust control assembly including a manifold movable with the ring support block and including a series of fluid delivery and exhaust passages for controlling supply of pressurized fluid to the cylinder assembly from a pressurized fluid source and for controlling exhaust of fluid from the cylinder assembly;

wherein movement of the manifold causes reciprocation of the cylinder assembly and wherein the ring member engagement mechanism functions to deliver the endmost ring member to the ring support block through the stopper structure opening upon movement of the cylinder assembly rod toward the ring support block.

4. A ring delivery and support mechanism, comprising:

a ring support block including spaced ring-receiving locations;

a ring supply mechanism for sequentially supplying individual rings to a supply location in alignment with one of the ring-receiving locations;

a reciprocating fluid-operated cylinder assembly including a rod;

ring engagement structure interconnected with the rod for engaging a ring at the supply location and moving the ring to one of the ring-receiving locations upon movement of the cylinder assembly rod toward the ring support block; and a fluid delivery and exhaust control arrangement including a manifold movable along with the ring support block for controlling supply of pressurized fluid from a pressurized fluid source to the cylinder assembly and for controlling exhaust of fluid therefrom.

5. A ring delivery and support mechanism, comprising:

a movable ring support block including spaced ring-receiving locations;

a movable work support disposed vertically above the ring support block for supporting a plurality of rings;

a movement arrangement operatively interconnected with the work support for moving the work support in a first direction;

stopper structure located in alignment with the rings as supported on the work support for receiving the endmost ring in the plurality of rings, wherein the stopper structure includes an opening sized such that the endmost ring can pass therethrough; and a ring delivery mechanism, comprising ring engagement structure movable between first and second positions, wherein the ring engagement structure in its first position engages and supports the endmost ring received by the stopper structure, and in its second position engages the endmost ring with one of the ring-receiving locations of the ring support block; and a reciprocation mechanism for moving the ring engagement structure between its first and second positions.

6. The mechanism of claim 5, wherein the reciprocation mechanism comprises a fluid-operated cylinder assembly having a movable rod interconnected with the ring engagement structure, and a fluid delivery and exhaust assembly including a manifold movable with the ring support block and including a series of fluid delivery and exhaust passages for controlling supply of pressurized fluid to the cylinder assembly from a pressurized fluid source and for controlling exhaust of fluid from the cylinder assembly.

7. A ring delivery and support mechanism for use in handling a plurality of ring members, each ring member having a gap, comprising:

a movable ring support for engaging and supporting the plurality of ring members;

force-applying means for applying a thrust force in a longitudinal direction to the work support for moving the work support in the longitudinal direction;

stopper structure in alignment with the ring support toward which the work support is moved by the force-applying means, wherein the stopper structure includes an opening sized such that a ring member can pass therethrough;

a ring support block disposed below the stopper structure and including a plurality of spaced ring-receiving locations;

a reciprocable transfer mechanism for receiving the endmost ring in the plurality of rings and for moving the endmost ring downwardly through the stopper structure opening to one of the ring-receiving locations of the ring support block; and a support block advancement mechanism for moving the support block such that the ring-receiving locations are sequentially positioned under the stopper structure opening.

8. The ring delivery and support mechanism of claim 7, wherein the reciprocable transfer mechanism is interconnected with the support block advancement mechanism such that, when the support block is moved to a position in which one of its ring-receiving locations is disposed below the stopper structure opening, the reciprocable transfer mechanism operates to move the endmost ring downwardly through the stopper structure opening and into one of the ring-receiving locations.

* * * * *